Aug. 29, 1961 L. E. PUGSLEY 2,997,900
MULTIPURPOSE TOOL FIXTURE
Filed Nov. 9, 1959 3 Sheets-Sheet 3
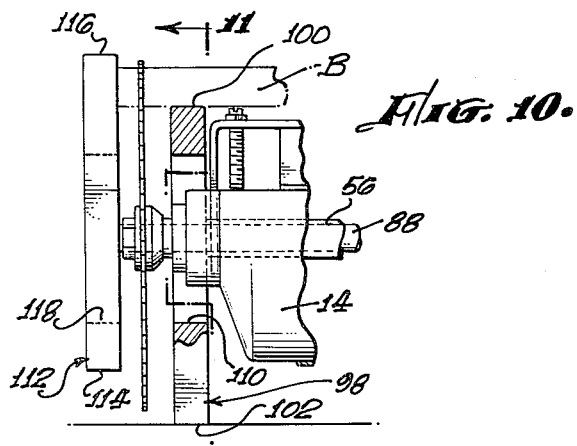
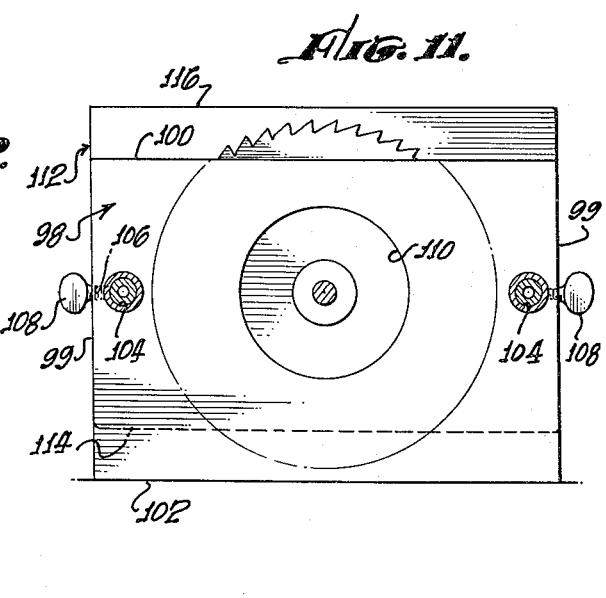
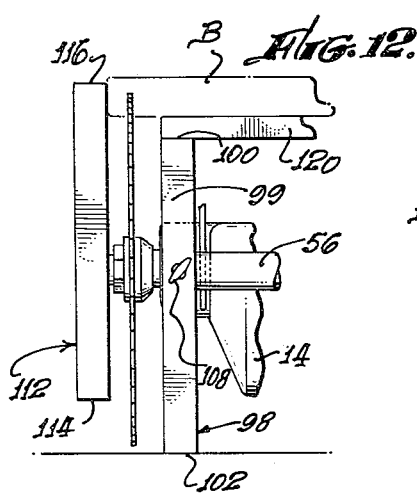
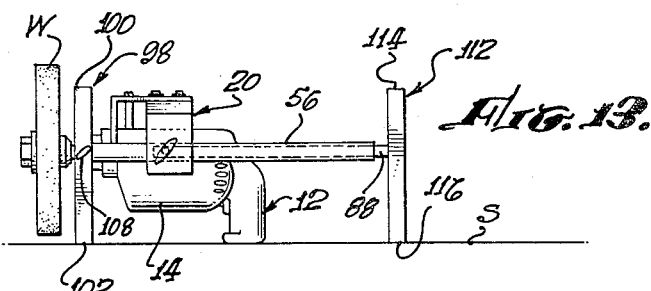
LAWRENCE E. PUGSLEY,
INVENTOR.
BY HIS ATTORNEYS
HARRIS, KIECH, RUSSELL & KERN.

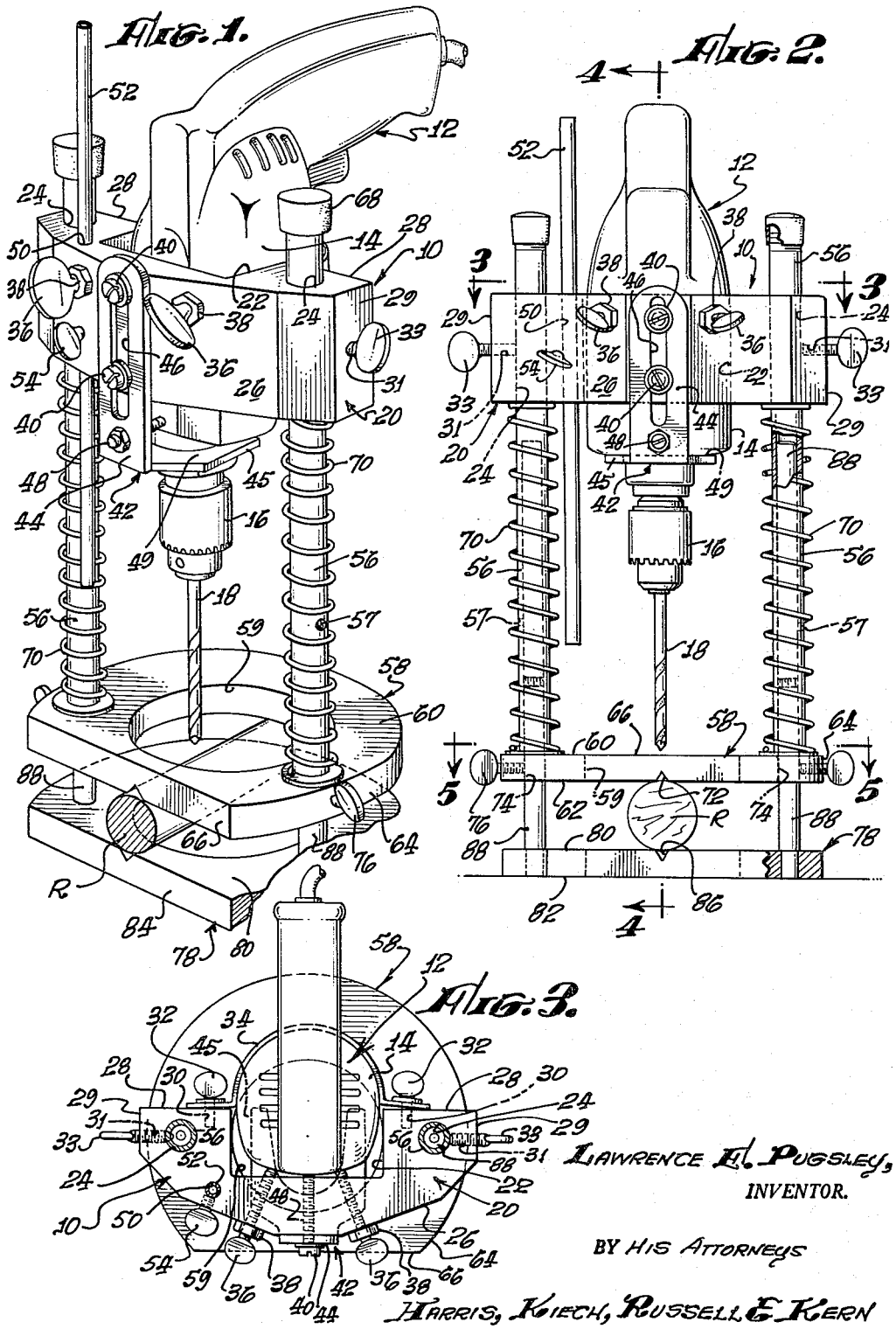

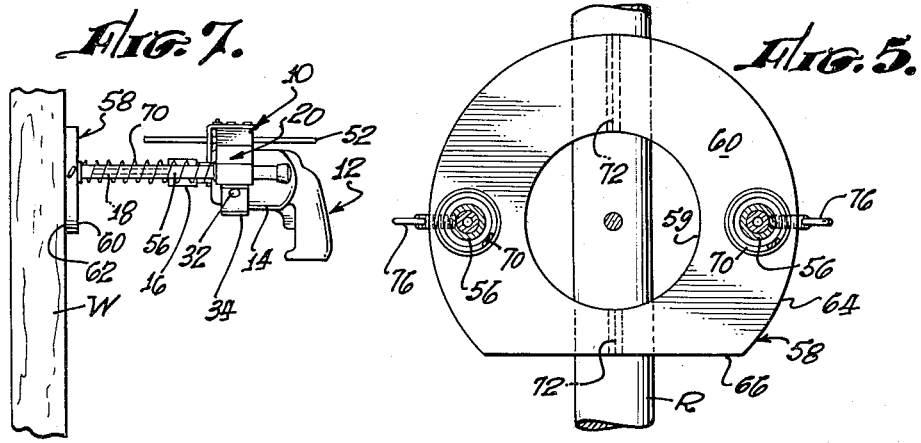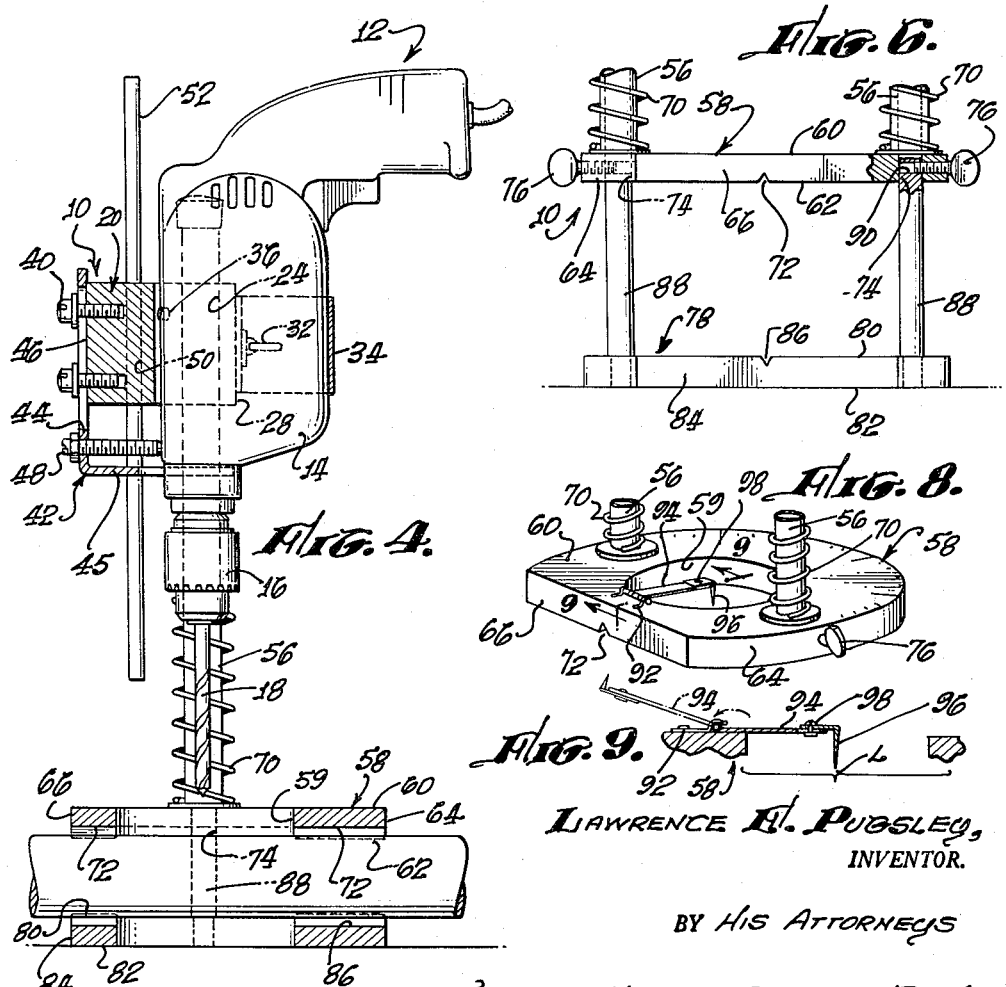

United States Patent Office 2,997,900
Patented Aug. 29, 1961

2,997,900
MULTIPURPOSE TOOL FIXTURE
Lawrence E. Pugsley, Box 656, R.R. 1, Escondido, Calif.
Filed Nov. 9, 1959, Ser. No. 851,645
7 Claims. (Cl. 77—7)

The present invention relates generally to the hand tool art, and more particularly to a novel multipurpose fixture for use with electric power drills such as accommodate drill bits having diameters of from about one-fourth inch to about one-half inch. It is well known in the art that hand supported power drills are unsatisfactory for drilling precision holes because of the inherent human error in maintaining the drill in a particular angular relationship with the workpiece. This is especially true when drilling holes in cylindrical stock and in pipes. One alternative is to carry the work to a stationary drill press with attendant additional time and expense, but the latter also has additional well known limitations. Furthermore, the use of a stationary drill press is often impractical because of the large size of the workpiece or when it is necessary to drill precision holes in installed equipment or building structures.

It is an object of the present invention therefore to provide a novel portable drill press and vise for accurately supporting an electric power drill at right angles to the workpiece so that the operator can drill a straight hole to a predetermined depth on the job site. More particularly, it is an object to provide such a portable device which accurately positions the drill at right angles to the workpiece and maintains it in that position during limited movement of the drill relative to the workpiece.

Another object is to provide a novel portable drill press and vise whereby round stock, pipe, and the like, and relatively narrow workpieces can be locked in predetermined position relative to the power drill so that precision holes can be drilled in them on the job site. More particularly, it is an object to provide a relatively simple vise assembly which is in a predetermined relationship with the drill-supporting means so that the workpiece can be locked in position, and the drill moved relative thereto along a straight-line path.

A further object is to provide a novel portable drill press and vise which can be used as a storage stand for the power drill when it is not in use.

Another object is to provide a fixture whereby a conventional power drill can be used alternately as a portable bench saw, a hand saw, or a portable grinder or the like. More particularly, it is an object to provide a fixture which can be used with a power drill in various cooperative positions, whereby the latter can have a saw blade or a grindstone or brush attached to the spindle thereof so as to use the same as a bench saw, a powered hand saw, or a portable grinder or power-driven brush.

Yet another object is to provide such a device which is simple in design and relatively inexpensive to manufacture, but which is rugged in construction and safe to use.

Further objects and advantages of the present invention will be apparent from the following detailed description, reference being had to the accompanying drawings wherein preferred embodiments of the present invention are shown.

Briefly stated, the invention includes a carriage for supporting a drill, the carriage being interconnected with a plate-like base member on one side thereof for movement relative thereto in a straight-line relationship. The carriage includes means for adjusting the angular position of the drill supported thereby so that there is a predetermined angular relationship between the drill and the base member and therefore between the drill and the workpiece engaged by the base member. A plate-like vise member may be interconnected with the base member on the other side thereof to be locked in spaced relationship therewith whereby a workpiece to be drilled can be held securely between the base member and the vise member. The carriage can also be locked in position relative to the plate-like base member and the drill chuck replaced with a saw blade or abrasive wheel whereby the device can be used as a saw or grinder.

In the drawings:

FIG. 1 is a perspective view of a novel portable drill press and vise constructed in accordance with the teachings of the present invention, showing a cylindrical workpiece locked in the device;

FIG. 2 is a front elevational view of the portable drill press and vise;

FIG. 3 is a horizontal sectional view taken on the line 3—3 in FIG. 2;

FIG. 4 is a vertical sectional view taken on the line 4—4 in FIG. 2;

FIG. 5 is a horizontal sectional view taken on the line 5—5 in FIG. 2;

FIG. 6 is a fragmentary front elevational view of the vise portion of the device with the two plate members fastened in spaced-apart relationship;

FIG. 7 is a reduced side elevational view of the device in position for drilling a hole in a large vertically extending workpiece such as a wall;

FIG. 8 is an enlarged fragmentary perspective view of the drill press base plate illustrating the use of the hole aligning member;

FIG. 9 is a fragmentary vertical sectional view taken on the line 9—9 in FIG. 8;

FIG. 10 is a fragmentary side elevational view of a modified construction, shown partially in section, illustrating the use of the device as a bench saw;

FIG. 11 is a vertical transverse sectional view taken on the line 11—11 in FIG. 10;

FIG. 12 is a view similar to FIG. 10 illustrating the use of a spacer to vary the depth of cut; and FIG. 13 is a side elevational view of a further modified construction illustrating the use of the device as a portable grinder.

Referring to the drawings more particularly by reference numerals, specifically FIG. 1, 10 indicates a novel fixture embodying the teachings of the present invention, in supporting relationship with an electrical power drill 12. The power drill 12 is of conventional construction and includes a housing 14 and a chuck 16 which holds a drill bit 18.

The fixture 10 includes a carriage 20 which is of general U-shape with a central cavity or groove 22 (FIG. 3) for receiving the housing 14, and which is flanked by circular openings 24 extending through the carriage in the axial direction. The carriage 20 contains an outer face 26, spaced inner faces 28, and end faces 29. The end faces 29 contain tapped openings 31 which receive thumb screws 33, for a purpose to appear. The inner faces 28 also contain tapped openings 30 which receive clamp thumb screws 32, the latter supporting an arcuate carriage clamp 34 which engages the housing 14 of the drill 12 to help support it in the cavity 22. Extending from the face 26 inwardly through the carriage 20 and into the cavity 22 (FIG. 3) are drill-positioning thumb screws 36 which are maintained in position by lock nuts 38. Extending into the body of the carriage 20 from the face 26 are two vertically aligned machine screws 40 (FIG. 4) which support an L-shaped bracket 42 containing a vertically extending upper portion 44 and a bifurcated lower portion 45. The upper portion 44 contains a slot 46 which receives the machine screws 40 and an adjusting lock screw 48 which extends inwardly under the carriage 20 and into engagement with the housing 14 of the drill. The bifurcated lower portion 45 contains an upper surface 49 which is beveled inwardly toward the center to better receive the drill housing 14. Thus, as shown in FIGS. 1 and 4, the upper surface 49 of the bifurcated portion of the bracket engages and supports the lower end of the drill housing 14. The drill-positioning thumb screws 36 and the lock screw 48 maintain the housing 14 against the carriage clamp 34 and provide the means for adjusting the angular position of the housing and the drill bit 18.

The carriage 20 also contains a vertically extending aperture 50 adjacent the face 26, said aperture slidably receiving a depth stop rod or tube 52 which is maintained in selected position by a depth stop lock screw 54 which extends inwardly from the face 26 into engagement therewith.

As previously mentioned, the carriage 20 contains circular openings 24 on each side of the central cavity 22. Slidably positioned in these openings are carriage guide tubes 56 which contain apertures 57 in the side walls thereof. The lower ends of the guide tubes 56 are fastened to an annular drill press base plate 58, the latter containing a circular opening 59, spaced upper and lower surfaces 60 and 62, respectively, an arcuate side face 64, and a flat side face 66. Stop caps 68 are removably fastened to the upper ends of the guide tubes 56 and coiled carriage-return springs 70 are positioned about said tubes between the carriage 20 and the drill press base plate 58. As shown in FIG. 2, the lower surface 62 of the base plate 58 contains a V-shaped groove 72 in the center thereof.

Apertures 74 are provided in the base plate 58 in alignment with the guide tubes 56 and vise-locking thumb screws 76 extend inwardly from the arcuate side face 64 into the apertures 74.

The vise portion of the device includes an annular vise base plate 78 which has flat upper and lower surfaces 80 and 82, respectively, and a flat side face 84 which is in alignment with the side face 66. A V-shaped groove 86 (FIG. 2) is provided in the upper surface 80 in alignment with the groove 72.

Fastened to the vise base plate 78 and extending upwardly therefrom are two vise guide posts 88 which extend through the apertures 74 and into the guide tubes 56. Transversely extending aligned openings 90 (FIG. 6) are provided in the guide posts 88 for receiving the inner ends of the thumb screws 76, whereby the plates 58 and 78 can be locked in spaced-apart relationship for a purpose to appear.

Referring to FIGS. 8 and 9, it will be noted that means can be provided on the drill press base plate 58 for accurately aligning it (and the drill bit 18) with a marking on the workpiece without depressing the drill 12. Thus, a hinge 92 may be mounted on the upper surface 60 adjacent the opening 59 for pivotally supporting an arm 94 which has an aligning tip 96 adjustably mounted on the end thereof by means of a screw and nut assembly 98.

To use the entire device for drilling a hole in a rod R as shown in FIGS. 1 and 2, the drill 12 is first fastened in the carriage 20 so as to be supported by the bifurcated bracket 42, the clamp 34, the drill-positioning thumb screw 36 and the lock screw 48. As previously mentioned, the bracket 42 can be adjusted in the vertical direction by means of the slot 46 and the screws 40 so that the carriage can accommodate different sized drills with different shaped housings. After the screws 40 are tightened, the thumb screws 36 and the lock screw 48 are further adjusted relative to the drill housing 14 so as to bring the drill bit 18 into a parallel relationship with the carriage guide tubes 56.

The vise-locking thumb screws 76 are then loosened, and the plates 58 and 78 moved apart so that the rod R can be positioned therebetween in the V-shaped grooves 72 and 86, the grooves aligning the workpiece with the drill bit 18. The base plates 58 and 78 are then moved together with the guide posts 88 sliding in the tubes 56 so as to clamp the rod R between the plates, and the vise-locking thumb screws 76 are then tightened to engage the posts 88. Assuming that the hole is to extend only half way through the rod R, the stop lock screw 54 is loosened and the depth stop tube 52 positioned so that the lower end thereof will contact the upper surface 60 when the drill bit 18 has penetrated the rod R to the desired depth. Thereafter, the lock screw 54 is tightened.

With the drill 12 energized, it and the carriage 20 are forced downwardly against the action of the springs 70 with the carriage 20 being guided by the tubes 56 until the drill bit 18 engages and penetrates the rod R. As mentioned above, when the drill bit 18 penetrates the rod R to the desired depth, the lower end of the stop tube 52 engages the upper surface 60 of the plate 58 and halts the downward movement of the drill. Because the rod R is parallel with the plates 58 and 78 and the plates are at right angles to the posts 88 in the tubes 56 (which are in turn parallel with the drill bit 18), it will be readily apparent that the drill bit 18 will produce a precision hole at right angles to the workpiece. A further advantage of this construction is that the vise base plate 78 elevates the workpiece above the support surface and permits the drill bit 18 to pass through the workpiece when desired, and thereby form a "clean" hole.

When the drill is released, the springs 70 urge the carriage 20 and the drill 12 away from the workpiece, and the vise portion can then be released to remove or reposition the workpiece.

When it is desired to drill a hole in a large flat object, e.g. a wall W (FIG. 7), the vise-locking thumb screws 76 are released and the vise base plate 78 with its posts 88 is removed from the assembly. Thereafter, the drill press base plate 58 can be positioned against the wall W and the drill 12 pressed inwardly against the action of the springs 70, the pressure exerted by the springs tending to hold the base plate 58 in position against the wall W.

In most instances the location of the hole can be ascertained by moving the unenergized drill 12 toward the workpiece until the tip of the drill bit 18 engages the workpiece. The unit can then be moved about until the tip and the location coincide. On the other hand, if it is desirable or necessary to align the drill bit with a hole location L (FIG. 9) without using the bit, this can be accomplished with the pivotally mounted arm 94. Thus, the arm 94 is pivoted to the position shown in FIG. 9 with the pointed end of the aligning tip 96 adjacent the workpiece, and the device then moved about until the pointed end coincides with the hole location L. Thereafter, the arm 94 is pivoted out of the way and the drill 12 used in the manner previously described.

In addition to functioning as a vise, the vise base plate 78 and the posts 88 can also be used as extension means. Assuming that a long drill bit 18 were required in drilling a hole in the wall W (FIG. 7), such that the tip of the drill would extend beyond the drill press base plate 58 with the drill 12 in the inoperative position as shown in FIG. 7, the base plate 78 and the guide posts 88 can be moved away from the base plate 58 (FIG. 6) until the openings 90 in the posts are in alignment with the ends of the thumb screws 76. The screws 76 are then moved inwardly, thereby securely locking the base plate 78 in the extended position so that it functions in the same manner as the drill press base plate 58.

As shown in FIGS. 10 through 13, the base plate and vise base constructions previously described can be slightly modified whereby the fixture can be used with the power drill as either a bench-type saw, a power hand saw, or a bench-type grinder or the like depending upon the position of the parts and the working means fastened to the spindle of the drill motor. Thus, the base plate 58 can be replaced with a modified base plate 98 which is of rectangular shape with opposed side edges 99 and flat top and bottom edges 100 and 102, respectively, the top and bottom edges being substantially parallel. Two spaced openings 104 are provided in the base plate 98 so as to be closer to the top edge 100 than to the bottom edge 102, and the carriage guide tubes 58 which are fastened to the base plate 98 in alignment with the openings 104 are therefore also closer to the edge 100 than to the edge 102. As shown in FIG. 13, the distance of the guide tubes 58 from the bottom edge 102 is such that when the carriage 20 is mounted on the guide tubes 58, the handle of the drill 12 rests on the surface S and the tubes 58 are substantially parallel with said surface. Tapped openings 106 are provided in the side edges 99 in alignment with the openings 104 and receive thumb screws 108. The modified base plate 98 also contains a relatively large circular aperture 110 adjacent the center thereof to permit the passage of the spindle or the drill bit 18.

The vise base 78 can also be replaced with a modified vise base 112 of rectangular shape having a top edge 114 and a bottom edge 116 (FIG. 13) which are substantially parallel. A relatively large aperture 118 is provided adjacent the center of the modified vise base 112 so that a drill bit can extend therethrough during a drilling operation. As previously described, spaced guide posts 88 are fastened to the vise base for insertion in the guide tubes 56 whereby a workpiece can be maintained in position between the base plate 98 and the vise base 112 during a drilling operation. In the modified construction, the posts 88 are fastened to the vise base 112 a distance from the top edge 114 equal to the distance between the top edge 100 of the base plate 98 and the guide tubes 56 fastened thereto.

When the device is to be used as a portable bench-type grinder (FIG. 13), the coiled springs 70 are removed from the guide tubes and the carriage 20 is moved to adjacent the base plate 98 whereby the thumb screws 33 are in alignment with the apertures 57 in the tubes. The vise base 112 is then removed from adjacent the base plate 98 and the guide posts 88 thereof inserted in the upper ends of the guide tubes 58 (after the caps 68 have been removed) so that the ends of the posts extend beyond the apertures 57. In this arrangement, the base plate 98 and the vise base 112 are positioned so that the bottom edges 102 and 116 thereof are in contact with the surface S, whereby the guide tubes 56 and the posts 88 are parallel with the surface S. The thumb screws 33 are then adjusted inwardly so that they extend through the apertures 57 and into engagement with the posts 88, thereby locking the members in assembled position. When the chuck 16 is replaced with an abrasive wheel assembly W, the device becomes a portable bench-type grinder as shown in FIG. 13. If the chuck 16 is replaced with a circular saw blade, this same arrangement can be used as a hand power-saw by merely rotating the assembly until the edges 100 and 114 bear on the surface to be cut.

To use the assembly as a portable bench-type saw, the carriage 20 is mounted in a locked position relative to the guide tubes 56 as previously described. However, the vise base 112 with its guide post 88 is removed from adjacent the top of the guide tubes 56, and the posts 88 inserted through the apertures 104 and into the lower ends of the tubes. In this arrangement, the bottom edge 116 of the vise base 112 is positioned adjacent the top edge 100 of the base plate 98 (the position of the two plate-like members merely being reversed), whereby a portion of the vise base 112 extends above the base plate 98 for use as a workpiece stop. Thus, with the drill 12 supported on the surface S by means of its handle and the base plate 98, the vise base 112 can be moved telescopically relative to the base plate 98 and locked in selected position by means of the thumb screws 108 engaging the posts 88. As previously mentioned, when the device is to be used for sawing, the chuck 16 is replaced with a saw blade assembly SA. The board B to be sawed (FIG. 10) is then placed on the top edge 100 of the base plate 98 with the end or edge thereof abutting the vise base 112, and the board B moved across the rotating saw teeth. If it is desired to cut a groove in a board B, the position of the periphery of the saw teeth relative to the board B can be varied by merely using a spacer block 120 (FIG. 12) between the board B and the edge 100 of the base plate 98.

Thus it is apparent that there has been provided a novel fixture which fulfills all of the objects and advantages sought therefor. It is to be understood that the foregoing description and the accompanying drawings have been given only by way of illustration and example, and that changes and alterations in the present disclosure which will be readily apparent to one skilled in the art are contemplated as within the scope of the present invention which is limited only by the claims which follow.

I claim:

1. In combination: a plate-like base member containing a plurality of spaced-apart guide apertures; guide tubes fastened to said base member in registry with the guide apertures; a carriage for supporting a power tool slidably mounted on said guide tubes for movement relative to the base member; a plate-like vise member containing a plurality of guide posts extending through said guide apertures and into the interior of said guide tubes providing for guided movement of the vise member relative to the base member to a predetermined position; and means for locking the vise member in the predetermined position.

2. In combination: a plate-like base member containing a plurality of spaced-apart guide apertures; guide tubes fastened to said base member in registry with the guide apertures; a carriage for supporting a power tool slidably mounted on said guide tubes for movement relative to the base member; a plate-like vise member containing a plurality of guide posts extending through said guide apertures and into the interior of said guide tubes providing for guided movement of the vise member relative to the base member to a predetermined position; and means for locking the vise member in the predetermined position including members mounted on the base member for holding engagement with the guide posts.

3. In combination: a plate-like base member containing opposed upper and lower surfaces and a side edge; a plurality of spaced-apart guide apertures extending through said base member; a plurality of guide tubes fastened to the upper surface of the base member in registry with the guide apertures; a carriage for supporting a power tool slidably mounted on said guide tubes for movement relative to the base member; a plate-like vise member containing upper and lower surfaces; guide posts fastened to the upper surface of the vise member extending through the guide apertures and into the interior of the guide tubes; and adjustable members projecting into the guide apertures from the side edge of the base member for binding engagement with the guide posts.

4. In combination: a plate-like base member containing opposed upper and lower surfaces and a side edge; a plurality of spaced-apart guide apertures extending through said base member; a plurality of guide tubes fastened to the upper surface of the base member in registry with the guide apertures; a carriage for supporting a power tool slidably mounted on said guide tubes for movement relative to the base member; a plate-like vise member containing upper and lower surfaces; guide posts fastened to the upper surface of the vise member extending through the guide apertures and into the interior of the guide tubes; passageways extending transversely through said guide posts a predetermined distance from the vise member; and adjustable members projecting into the guide apertures for insertion in said passageways for maintaining the base member and the vise member in spaced-apart relationship.

5. In combination: a plate-like base member containing an aperture adjacent the center thereof and opposed upper and lower surfaces; a carriage for supporting a power tool adjacent said upper surface; guide means interconnecting the carriage and the base member providing straight-line movement therebetween; a V-shaped groove in the lower surface of the base member traversing it and the aperture contained therein; a plate-like vise member containing opposed upper and lower surfaces mounted for adjustable movement relative to the base member with the upper surface of the vise member and the lower surface of the base member in opposed relationship, said vise member containing a V-shaped groove in the upper surface thereof in alignment with the groove in the base member; and means for locking the base member and the vise member in adjusted spaced-apart relationship.

6. In combination: a first plate-like base member having opposed, flat, first and second side edges; an opening adjacent the center of the base member; two guide apertures spaced an equal distance from the first edge, the apertures being closer to the first edge than to the second edge; two guide tubes fastened to the base member in registry with the guide apertures so as to extend at right angles to the base member; a carriage for supporting a power tool housing mounted on said guide tubes; means for fastening the carriage to the guide tubes in selected spaced relationship with the first base member; a second plate-like base member having two, opposed, flat, side edges, the distance between said side edges being substantially the same as the distance between the first and second side edges of the first base member; and two guide posts fastened to the second base member normal thereto and spaced from one side edge thereof a distance equal to the distance between the guide tubes and the first edge of the first base member, the guide posts being spaced apart a distance equal to the spacing of the guide tubes whereby the posts can be inserted in the tubes for relative telescoping movement.

7. In combination: a first plate-like base member having opposed, flat, first and second side edges; an opening adjacent the center of the base member; two guide apertures spaced an equal distance from the first edge, the apertures being closer to the first edge than to the second edge; two guide tubes fastened to the base member in registry with the guide apertures so as to extend from the base member at right angles thereto; a carriage on said guide tubes for supporting a power tool housing containing a handle portion having a butt end, the relationship between the parts being such that when the second side edge of the base member is positioned on a surface with the guide tubes substantially parallel thereto, the butt end of the tool housing supported in the carriage will also be positioned on said surface; a second plate-like base member having two, opposed, flat, side edges, the distance between said edges being substantially the same as the distance between the first and second edges of the first base member; and two guide posts fastened to the second base member normal thereto and spaced from one side edge thereof a distance equal to the distance between said guide tubes and the first edge of the first base member, the guide posts being spaced apart a distance equal to the spacing of the guide tubes whereby the posts can be inserted in the tubes for relative telescoping movement.

References Cited in the file of this patent

UNITED STATES PATENTS

| | | |
|---|---|---|
| 1,316,028 | Halbreich | Sept. 16, 1919 |
| 1,771,399 | Christophel | July 29, 1930 |
| 2,360,942 | Ellerstein | Oct. 24, 1944 |
| 2,373,927 | Turner | Apr. 17, 1945 |
| 2,888,965 | Phillips | June 2, 1959 |
| 2,909,083 | Chestnut | Oct. 20, 1959 |